United States Patent Office 3,001,952
Patented Sept. 26, 1961

3,001,952
NICKEL-KAOLIN-HYDRAULIC CEMENT CATALYST
Ronald E. Reitmeier, Middletown, and Paul E. Huber, Louisville, Ky., assignors to Catalysts and Chemicals Inc., Louisville, Ky., a corporation of Delaware
No Drawing. Filed May 22, 1958, Ser. No. 736,990
10 Claims. (Cl. 252—455)

The present invention relates to improvements in the production of hydrogen by the catalytic decomposition of hydrocarbons and more particularly in the preparation of suitable catalysts therefor. The invention relates more particularly to the preparation of catalytic masses which possess the property of cohering in self-supporting units in which the form of the units permits the catalyst and catalyzed material to come into an effective contact during the reaction.

The commercial preparation of hydrogen by the catalytic decomposition of hydrocarbons with steam has assumed great importance in industrial chemical operations, such as in the synthesis of ammonia, alcohols and synthetic fuels as well as providing a source of hydrogen for various hydrogenations. In carrying out these processes it has been found advantageous to employ very active catalysts as for example those that contain nickel, kaolin and magnesium oxide.

One of the major problems which has confronted the industry has been that of bringing the catalyst into intimate, effective contact with the charge material and of maintaining the catalyst surface so that this intimate contact may be continued for a satisfactorily long period of time. According to one theory widely accepted (see "Catalysis" by Berkman, Morrell and Egloff) catalysis is a surface phenomenon. Catalytic activity is believed to be due to unsatisfied valence forces in metallic or metallic oxide atoms by virtue of their position with respect to other atoms in the catalyst. These forces are believed to be smallest within the body of the material and greater near or at the surfaces where these forces are unbalanced and greatest on the edges and points. An amorphous material is generally believed to be more catalytically active than the crystalline form since in crystals secondary forces or valences are considered to be directed toward the crystal's center whereas in amorphous bodies these valences are directed toward the outside of the unit of the material. However, at high temperatures, in the range of 1200-1900° F., such as are encountered in the steam-methane reaction, it is impossible to maintain catalytic material in an amorphous form. As a consequence the surface area of the catalyst is dependent almost entirely upon the size, shape, and microporosity of the catalyst. This we shall term geometric surface area as opposed to microscopic surface area. In low temperature reactions, amorphous materials do not change or change only slowly to the crystalline form so that the microporosity of the catalytic constituents is the greatest one factor in contributing to the surface area. Thus, for example in utilizing carriers such as silica gel, a surface area in the range of 400-600 square meters per gram is obtained by virtue of the innumerable microscopic pores which for the most part are less than 20 angstroms in diameter. With activated alumina, at low temperatures, surface areas (due to the microscopic pores in the material) in the range of 200-350 square meters per gram are obtained. Consequently with these carriers the geometric shape of the catalyst is of slight importance in relation to the surface area of the mass. However, at high temperatures the microscopic surface area is lost and such surface area as is available is due to the size or the shape of the catalyst. Therefore, it is necessary that there be maintained within a given volume the largest practicable geometric surface area which may be brought into contact with the material to be catalyzed. Accordingly, when dealing with a solid catalyst, it is desirable to use it in a form which presents the greatest surface area so that the greatest proportion of the catlyst in the reaction zone takes part in catalyzing the reaction and the highest catalyst efficiency is obtained.

One method of preparing catalysts heretofore employed is that of tableting a granular or powdered catalyst material into various shapes in an endeavor to insure the material retaining the resulting shape during reaction and regeneration. These forms may be rods, cylinders, spheres, spools, etc. in various shapes, sizes and proportions. There are three main purposes for this procedure:

(1) To permit easy handling.
(2) To increase the contact surface of a given amount of catalyst in a given amount of reactor space.
(3) To improve the passage of fluids through the catalyst while increasing the time between regenerations.

Generally, however, the resulting shapes do not have adequate strength, rigidity, crushing resistance, resistance to abrasion upon handling and resistance to thermal shock on being used in conversion and during regeneration. Accordingly the geometric shapes which tend to give the largest geometric surface are apt to break or spall resulting in catalyst fines that plug up the free reaction spaces and increase the pressure drop across the reaction zone.

An object of this invention, therefore, is to provide a method for producing tableted catalyst of various geometric shapes which possess adequate mechanical strength and resistance to abrasion as well as resistance to thermal shock. A more specific object of this invention is to provide a method for preparing a catalyst comprising nickel, kaolin and a hydraulic cement which has exceptional mechanical strength when tabletted.

According to this invention superior catalysts are prepared by admixing nickel salts with kaolinitic clays and calcining the mixture to decompose the salts to the oxides. This mixture is then mixed with about 35% by weight of water to form a thick, plastic mud. To this mud is added a hydraulic cement in sufficient amount to change the consistency of the mud to a granular mass suitable for pelleting. In this manner the material may be pelleted almost immediately without any loss of the initial set of the hydraulic cement. The pelleted catalysts may then be cured by being sprinkled or sprayed with water for several days and then are preferably shrunk by calcination at a temperature in the range of 1200-1800° F.

As used in this application kaolinitic clay is defined as a material resulting from the natural weathering of feldspar and includes both primary kaolins such as china clay or secondary kaolins such as ball clay. Such clays are unique materials found in large quantities in nature and are readily distinguishable from and have definite advantage over other materials proposed for this purpose. We are aware that certain naturally occurring materials such as fuller's earth, bentonite and montmorillonite and similar mineral adsorbent substances have been mentioned for use in catalysts of this type. However, none of these materials has the desirable properties of the kaolinitic clays as will be apparent from the following characterizations and properties. Kaolinitic clays are of a natural plastic nature having remarkably high uniformity in their properties and are composed of silicon, oxygen and hydrogen according to the general formula $Al_2O_3 2SiO_2 2H_2O$ They are sometimes referred to as comprising aluminum silicates but are probably composed of aluminosilicic acid.

Kaolinitic clays differ from the adsorbent clays and can, therefore, be distinguished therefrom in the following respects. Infusorial earth, kieselguhr, or silica gel are siliceous materials and are, therefore, entirely different in composition and properties in that they lack plasticity and the property of hardening. Fuller's earth is not a true clay in that it lacks plasticity entirely and it is readily fusible unlike china clay. Montmorillonite also has very little plasticity. It is composed largely of hydrogels of silica and is decomposed by boiling acids such as HCl. Bentonite, while highly colloidal, also lacks plasticity. Both montmorillonite and bentonite have a much higher silica to alumina ratio and water content than do the kaolinitic clays. They are both amorphous whereas the kaolinitic clays show a crystalline X-ray structure.

Hydraulic cements as used in this application include the familiar Portland cement, blast furnace or slag cements or the cements consisting primarily of calcium aluminates which are sold under the trade name of Ciment Fondu, Rolandschutte or Lumnite. In addition, slaked lime or quick lime when mixed with water forms a mortar which has a cementing action. The first class of cements, namely the Portland cements, are composed primarily of calcium silicates and upon setting liberate free calcium oxide. Generally gypsum (calcium sulfate), is added to retard the setting of Portland cement. This is sometimes disadvantageous in the preparation of catalysts in that under reaction conditions, with hydrogen at high temperatures, $H_2S$ is liberated which tends to temporarily poison the catalyst in the reactor. The aluminous cements, on the other hand, utilize another type of retarder and, therefore, do not offer the same problem as does the gypsum retarders utilized in Portland cements. We have found, however, that one of the most preferred cements which can be utilized comprises ground Portland cement clinker to which gypsum has not been added. When ground Portland cement clinker is utilized according to the method of this invention, a quick initial set is obtained in the tableted catalyst which would be largely lost if the catalyst were prepared in the conventional manner. Further the ground clinker is substantially free of sulfur, resulting in an active, physically rugged catalyst which requires no further treatment to reduce the sulfur content thereof. Other hydraulic cements such as slaked lime, zirconium cement and magnesium cement may be utilized to advantage.

The concentration of the various constituents of the catalyst may vary over a considerable range. The nickel concentration may range from four to thirty-five percent by weight (as metal) of the total composite. Other factors being equal, the higher the concentration of nickel in the catalyst the higher the activity of the catalyst. We have found, however, that a suitable concentration of nickel lies within the range of from about 15–30%. The catalysts are preferably promoted with the oxides of the metals on the left hand side of the second group of the periodic table, viz. magnesia, calcium oxide, barium oxide or strontium oxide. These materials may be added by coprecipitating with the nickel constituent or by merely admixing same with the nickel salt.

A metal oxide such as magnesia in a concentration of about 4 to 15% by weight of the total composite is preferred. Other promoters, such as chromium oxide or aluminum oxide may be used to promote the nickel and if utilized are preferably added by coprecipitation from a solution of nickel and the promoting metal. This class of promoters should not exceed about 5 percent by weight of the total catalyst composite and as little as 1 percent by weight has been found effective. The kaolinitic clay should constitute at least 20 percent by weight of the finished catalysts and may constitute as much as 80 percent by weight. The hydraulic cement preferably is utilized in a concentration of between 20–30% by weight of the finished catalyst, however, as little as 12% by weight may be utilized with favorable results, especially if it is desired to produce a catalyst containing a high concentration of nickel.

The method of preparing and treating the various constituents of the catalyst may vary appreciably. We have found for example that one of the most economical nickel salts is nickel nitrate prepared by dissolving metallic nickel in nitric acid. However, if a catalyst containing between 20–30% by weight of nickel (as metal) is desired an aqueous solution of nickel nitrate mixed with kaolin produces a mass which is too wet to work properly in conventional mixing machinery. Accordingly a mixture of dry commercial nickel carbonate and an aqueous solution of nickel nitrate may be utilized to impregnate the kaolin and form a mud of a proper consistency for easy working. Alternately, nickel hydroxide or carbonate may be precipitated from the nitrate solution by the addition of ammonia, sodium carbonate or milk of lime in which case it may be advantageous to add a promoter such as a salt of chromium or aluminum which is simultaneously precipitated with the nickel carbonate or hydroxide. The resulting precipitate may then be filtered or thickened by use of suitable thickening apparatus such as a Dorr-Oliver thickener and kneaded with the kaolin and group II metal salt promoter. The kaolin and promoters may also be impregnated with nickel nitrate and subsequently calcined and reimpregnated until the proper concentration of nickel is obtained. The wet mud is calcined to decompose the nickel salts to produce nickel oxide and the dry mixture is then mulled with about 30 to about 40% by weight of water and to this resulting thick mud is added powdered hydraulic cement which upon mixing forms a granular mass. At this point it is sometimes advantageous to add various adsorbents to take up any excess water. After the addition of the hydraulic cement to the mud, the material should be tableted within 6 hours in order to take advantage of the initial set of the hydraulic cement. We have found that adsorbents with an acicular macro structure such as is possessed by the silicified skeletal remains of diatoms tend to impart considerable rigidity to the shaped catalyst. Other materials of an adsorbent nature such as starch, charcoal, methyl cellulose and other adsorbent carbonaceous materials may be added which are subsequently decomposed upon calcination of the shaped catalyst and thereby increase the surface area thereof by the formation of macro pores. We prefer to add adsorbents of both classes and thus take advantage of the properties imparted by each. The porosity may also be increased by the addition of substantially non-adsorbent, carbon compounds such as carbon black, sugar or synthetic material such as condensation resins. Induced pores formed by the combustion of carbonaceous materials usually have diameters of several thousand angstroms and, therefore, constitute a difference in kind over the naturally occurring micro pores which are destroyed by sintering of the catalyst mass at high temperatures.

Reference is now made to the following examples which further illustrate this invention.

*Example 1*

A conventional catalyst was prepared as follows: 184 parts by weight of nickel powder was dissolved in nitric acid. The resulting nickel nitrate solution was diluted with water and an aqueous sodium carbonate solution, which contained about 384 parts by weight of sodium carbonate, was added. The precipitate was filtered, and the filter cake washed with water at about 40° C. and dried.

A third of the filter cake was then mixed in a Simpson mix muller with about 178 parts by weight of Kentucky ball clay, 76 parts by weight of magnesium oxide and an aqueous nickel nitrate solution containing about 36 parts by weight of nickel as a 15 percent solution. The resulting mud was then calcined for about 7 hours at about 900° F. About 50 parts by weight of the powder was mixed with about 15 parts by weight of hydraulic cement and about 25 parts by weight of water. This material was allowed to air dry for about 12 hours and was then granulated through a 12 mesh screen. 3% of graphite was added and the material was tableted into ⅝ inch rings. The rings were stacked and sprinkled with water twice daily for 3 days. The rings were then calcined at a temperature of about 1600° F. for 6 hours. The side crush strength of the finished catalyst averaged about 45 pounds.

*Example 2*

A catalyst was prepared by admixing about 360 parts by weight of nickel carbonate, 178 parts by weight of Kentucky ball clay and 76 parts by weight of magnesite, with about 36 parts by weight of nickel as a 15% nickel nitrate solution in a Simpson mix muller. The resulting mud was calcined for about seven hours at about 900° F. About fifty parts by weight of this dried powder, consisting of Kentucky ball clay, nickel oxide and magnesium oxide, was then mulled with about 35% by weight of water until a thick mud was formed. About 15 parts by weight of finely ground Portland cement clinker was mulled into the mud until the mass assumed a semi-dry granular consistency. This mass was immediately granulated through a 12 mesh screen, mixed with about 3% by weight of graphite and immediately tableted into ⅝ x ⅝ inch rings. These rings were stacked and sprinkled with water twice daily for 3 days. The rings were then calcined at 1600° F. for about six hours. The side crush strength of the rings averaged about seventy-five pounds.

It will be noted that the side crush strength of the catalysts produced by the method of Example 2 was 30 pounds greater than the side strength of catalysts produced by the method of Example 1. The advantage of such increased strength enables the practical utilization of methods which increase the geometric surface of the catalyst such as the tableting of spools, rings, and saddles or the use of pore induction techniques with these or more conventional catalyst shapes.

It is obvious that many variations and modifications will occur to those skilled in the art, which do not depart from the spirit and scope of this invention; therefore, only these limitations should be imposed as are encompassed by the appended claims.

We claim:
1. A method of preparing a tableted supported nickel catalyst having improved strength comprising mixing a nickel salt and kaolinitic clay in the presence of sufficient water to form a mud, calcining said mud for a time and at a temperature to provide a dry product in powder form, mixing said dry product with about 12–30% of hydraulic cement and about 30 to about 40% of water based upon the weight of mud dry product to form a cement-containing mud, said mixing being continued for a period of time to cause the cement in said mud to absorb water from said mud to form a mass which is readily granulated through a screen, granulating said mass after said time through said screen and tableting said granulated mass into the desired shape, the time for tableting said granulated mud being within six hours from the time said cement is added.

2. A tableted catalyst comprising an amount of nickel oxide expressed as metal of not less than 4% and not more than 35% by weight and an amount of a kaolinitic clay of not less than 20% by weight and not more than 80% by weight and a hydraulic cement in an amount of not less than 12% and not more than 30% by weight, said catalyst having been prepared by the method of claim 1.

3. The method of claim 1 wherein said tableted nickel salt mixed with said clay is nickel carbonate and wherein said cement is added to a mixture of said dry product and water.

4. The method of claim 3 wherein said hydraulic cement is ground Portland cement clinker.

5. The method of claim 3 wherein said hydraulic cement is slaked lime.

6. The method of claim 3 wherein a graphite lubricant is added prior to granulating said mass through said screen.

7. The method of claim 3 wherein magnesium oxide in an amount of 4–15% by weight of the total catalyst is added to said kaolinitic clay.

8. The method of claim 3 wherein an oxide of the metal on the left-hand side of the second group of the periodic table is added to said nickel salt and said clay in the presence of water to form said mud before calcining in an amount of from 4–15% by weight of the total catalyst.

9. The method of claim 3 wherein chromium oxide promoter in an amount of less than 5% by weight of the catalyst is added to said nickel salt and said clay in the presence of water to form said mud before calcining.

10. The method of claim 3 wherein aluminum oxide promoter in an amount of less than 5% by weight of the catalyst is added to said nickel salt and said clay in the presence of water to form said mud before calcining.

References Cited in the file of this patent

UNITED STATES PATENTS 2,056,911    Schiller _____ Oct. 6, 1936
2,840,531    Fleming _____ June 24, 1958

OTHER REFERENCES

Faragher et al.: "Manufacture and Regeneration of Catalysts," U.S. Bureau of Mines Information Circular 7368, page 5, July 1946.

Holroyd: "Report on Investigations of Fuels and Lubricants," U.S. Bureau of Mines Information Circular 7375, page 37, August 1946.